Patented Aug. 15, 1933

1,922,816

UNITED STATES PATENT OFFICE 1,922,816

PREPARATION OF STABILIZED TITANOUS SALT SOLUTIONS

Robert M. McKinney, Baltimore, Md., assignor, by mesne assignments, to Krebs Pigment and Color Corporation, Newark, N. J., a Corporation of Delaware No Drawing. Application April 27, 1931
Serial No. 533,370

10 Claims. (Cl. 23—250)

The present invention relates to stabilized titanous salts. More particularly it relates to methods of preparing stabilized titanous sulfate solutions suitable for use in the discharge of coloring agents used in dyeing textiles.

There is a considerable demand for solutions suitable for use in the textile industries as stripping reagents in removing dyes from fabrics. Trivalent titanium solutions possess very strong reducing properties and under proper conditions are well suited for such purposes. In most cases, the sulfate is a suitable and economical form in which to use the titanium compound. It has been found, however, that ordinary titanous sulfate is objectional for general uses as a reducing agent on account of the fact that when it becomes oxidized to the tetravalent form in dilute solutions, a precipitate of insoluble titanium hydroxide is formed.

A number of methods have been suggested in the past whereby solutions of titanous sulfate might be "stabilized" so as to prevent the precipitation of titanium hydroxide. All of these methods, however, have possessed certain inherent disadvantages from the point of view of the method of stabilization employed and the cost and quality of the final product. Former processes, for example, have required the use of pure titanium compounds such as titanium hydroxide or oxide as the starting material for the production of stabilized titanous sulfate. In the process now about to be disclosed this precaution is entirely unnecessary, it being possible to employ as the starting material titanium compounds containing large amounts of iron and other impurities usually present in crude titanium liquors and obtain therefrom at low cost an excellent and stable form of titanous sulfate.

Titanium compounds are ordinarily prepared by treating ilmenite, or other suitable titanium-containing ore, with hot sulfuric acid. In this step some of the sulfuric acid combines with some of the ilmenite to form a dry mass composed largely of titanium sulfate and ferrous sulfate but containing a small amount of ferric sulfate, undecomposed ilmenite, free sulfuric acid and a small amount of gangue, and mud forming constituents. The mass is then treated with water to dissolve the titanium and ferrous sulfates and effect a separation of the unattacked ilmenite.

In order to obtain pure titanium compounds it is generally necessary to regulate the operating conditions so as to maintain the titanium sulfate in solution until at least the major portion of the impurities present in the solution have been removed therefrom. During the treatment of the attack mass with water it is customary to add to the solution metallic iron in order to assure a complete reduction of the ferric iron to the ferrous state. The solution thus obtained is usually first clarified or freed of its positively charged colloidal mud suspension by coagulating it with an oppositely charged colloid such as free sulfur or copper sulphide, which may be formed "in situ" from iron sulphide and copper sulfate. About 75% of the ferrous sulfate is next removed as crystals of copperas from the solution by the aid of refrigeration. Further freedom from iron is obtained by hydrolyzing or precipitating the titanium as oxide or hydroxide and subsequent washing of the latter, the soluble ferrous sulfate being removed in these operations. This titanium oxide or hydrate is then treated with acids to get the pure titanic salts. The titanous salts are obtained by reduction of solutions of the latter by the aid of either metallic zinc or by the use of electric current.

In place of preparing titanous sulfate as outlined above and attempting to use it as such or even treat it so as to render it stable under operating conditions, it has now been found that the following simplified procedure may be substituted: To crude titanium sulfate solution obtained, for example, as above described and containing large quantities of iron sulfates, there is added a "stabilizing" material consisting of certain organic acids or salts thereof, as for example, citric, tartaric, oxalic, lactic, malic, and other hydroxy-organic acids, sodium and calcium citrates and lactates, sodium oxalate, etc. The solution thus stabilized may then be conveniently treated for the removal of impurities without danger of hydrolysis and resultant precipitation of a part or all of the titanium, it being entirely stable under both neutral and acid conditions.

After the addition of the stabilizer, the solution may be neutralized with lime or other cheap alkali, such as caustic soda, soda ash or ammonia. The iron in solution may next be removed by precipitation with any soluble sulfide, such as, for example, sodium sulfide or black ash liquor (barium sulfide). After the removal of the iron the titanium sulfate in the resulting solution may be reduced to titanous sulfate by means of an electric current or by reaction of an acid in the solution with a metal such as zinc.

The following specific example will serve to illustrate better the operation of the process but it is distinctly understood that the scope of the invention is not limited to the particular procedure set forth but includes the usual equivalents. To 333 c.c. of a titanium solution of the following composition:

| | |
|---|---|
| TiOSO$_4$ as TiO$_2$ | 167 gms. per liter |
| FeSO$_4$ as Fe | 44 gms. per liter |
| Free and combined H$_2$SO$_4$ | 419 gms. per liter, | are added 126 grams of lactic acid, followed by 124 grams of commercial hydrated lime. If desired, the calcium sulfate, precipitated by the addition of the lime may be removed at this point by filtration but if it is not desired to recover the precipitates separately the filtration at this point may be omitted. To the solution is next added 35 grams of technical sodium sulfide (60% chips), which serve to precipitate the iron as ferrous sulfide, which may or may not be removed by filtration at this point, as desired. Next, 50 grams of additional sulfuric acid are added to the solution, resulting usually in the precipitation from the neutral solution of further calcium sulfate from the calcium lactate in solution. When the final precipitate has been separated from the solution the latter is ready for reduction by any of the usual methods. By this procedure, 90–95% of the theoretical yield of stabilized titanous sulfate may be obtained. For many purposes the stabilized titanous sulfate solution obtained as has just been described may be too dilute either for satisfactory use or economical transportation. If desired, therefore, the concentration of the solution may be increased by evaporation or other suitable means.

While the procedure outlined above may obviously be modified in a number of ways, one modification having particular advantages under certain circumstances consists of substituting for the organic acid stabilizer, a salt of said organic acids. In the procedure outlined in the example cited above it is possible to substitute, for example, calcium lactate, or even a crude calcium lactate liquor such as that obtained in the production of lactate acid by the fermentation of carbohydrates, for the lactic acid. When calcium lactate, or a solution thereof, is used, it is first introduced into the solution of crude titanium sulfate, whereupon a precipitate of calcium sulfate is generally formed. Sufficient lime, or other alkali, is then added to complete the neutralization of the solution, and the insoluble calcium sulfate removed by filtration, or otherwise. The remainder of the operation may then be carried out as indicated above.

If preferred, the operation may be somewhat simplified by first adding to the crude titanium sulfate liquor the stabilizer, then immediately neutralizing the solution and precipitating the iron compounds by the addition of a soluble sulfide. The precipitates formed during previous operations may then be removed. The titanium sulfate solution thus obtained, and substantially free from iron and other impurities is then ready for the reduction operation. To carry out the latter operation the solution is first acidified, whereupon a precipitate may form, depending upon the preceding treatment (i. e., any calcium or other alkaline earth metal ions introduced during the neutralizing operation or in the form of a salt of the stabilizing acid, will be precipitated at this point if sulfuric acid is used for acidifying the solution prior to reduction). Any precipitate formed at this point is preferably removed and the resulting solution subjected to reduction by electrolysis or by means of other suitable means.

What is claimed is:

1. A method of producing stabilized titanous salt which comprises adding to titanium salt solutions stabilizers selected from the group consisting of organic acids and metal salts thereof, removing the iron compounds from said titanium sulfate solutions, and reducing the titanium in said solutions to the titanous form.

2. In a method of producing stabilized titanous salt, the steps which comprise adding to titanium salt solutions stabilizers selected from the group consisting of citric, tartaric, oxalic, lactic, malic and other hydroxy-organic acids, and metal salts of said acids; removing the iron compounds from said titanium sulfate solutions, and reducing the titanium in said solutions to the titanous form.

3. In a method of producing stabilized titanous salt, the steps which comprise adding to titanium salt solutions stabilizers selected from the group consisting of citric, tartaric, oxalic, lactic, malic and other hydroxy-organic acids, and metal salts of said acids; neutralizing the resulting solutions, removing iron compounds from said solutions, and reducing the titanium in said solutions to the titanous form.

4. In a method of producing stabilized titanous salt, the steps which comprise adding to titanium salt solutions stabilizers selected from the group consisting of citric, tartaric, oxalic, lactic, malic and other hydroxy-organic acids, and metal salts of said acids; neutralizing the resulting solutions, precipitating the iron compounds in said solutions by the addition of soluble sulfides, removing said precipitated iron compounds, and reducing the titanium in said solutions to the titanous form.

5. In a method of producing stabilized titanous salt, the steps which comprise adding to titanium salt solutions stabilizers selected from the group consisting of citric, tartaric, oxalic, lactic, malic and other hydroxy-organic acids, and metal salts of said acids; neutralizing the resulting solutions, precipitating the iron compounds in said solutions by the addition of soluble sulfides, removing said precipitated iron compounds, acidifying the resulting solution and reducing the titanium in said solution to the titanous form.

6. In a method of producing stabilized titanous salt, the steps which comprise adding to titanium salt solutions stabilizers selected from the group consisting of citric, tartaric, oxalic, lactic, malic and other hydroxy-organic acids, and metal salts of said acids; neutralizing the resulting solutions, removing any precipitate thereby formed, adding to the resulting solution a sufficient amount of soluble sulfides to insure the precipitation of the iron compounds therein, removing the precipitated iron sulfides, acidifying the resulting solution, removing any precipitate formed, and reducing the titanium in the resulting solution to the titanous form.

7. In a method of producing stabilized titanous salt from crude titanium salt solutions, the steps which comprise adding to titanium salt solutions stabilizers selected from the group consisting of citric, tartaric, oxalic, lactic, malic and other hydroxy-organic acids, and metal salts of said acids; neutralizing the resulting solutions, removing any precipitate thereby formed, adding to the resulting solution a sufficient amount of soluble sulfides to insure the precipitation of the iron compounds therein, removing the precipitated iron sulfides, acidifying the resulting solution, removing any precipitate formed, and reducing the titanium in the resulting solution to the titanous form.

8. In a method of producing stabilized titanous salt from crude titanium sulfate solutions containing soluble iron compounds, the steps which comprise adding calcium lactate to said solutions, neutralizing and filtering said solutions, precipitating the soluble iron compounds with sodium sulfide, filtering the resulting solution, acidifying the filtrate and removing any precipitate formed, and reducing the titanium in the resulting solution to the titanous form.

9. As a reducing agent an aqueous solution of tri-valent titanium containing as a stabilizing agent a compound selected from the group consisting of citric, tartaric, oxalic, lactic, malic and other organic hydroxy-carboxylic acid.

10. As a reducing agent an aqueous solution of tri-valent titanium containing as a stabilizing agent lactic acid.

ROBERT M. McKINNEY.